United States Patent [19]
Kierzkowski

[11] Patent Number: 5,352,409
[45] Date of Patent: Oct. 4, 1994

[54] BUFFER AND METHOD FOR BUFFERING HOT TUBS AND SPAS

[75] Inventor: David J. Kierzkowski, Milwaukee, Wis.

[73] Assignee: Great Lakes Biochemical Company, Inc., Milwaukee, Wis.

[21] Appl. No.: 78,603

[22] Filed: Jun. 17, 1993

[51] Int. Cl.$^5$ ............................................. C23F 11/08
[52] U.S. Cl. ......................................... 422/14; 422/7; 4/DIG. 1; 4/DIG. 10
[58] Field of Search ...................... 422/7, 14; 504/122, 504/151, 153; 4/DIG. 1, DIG. 10; 210/169

[56] References Cited

U.S. PATENT DOCUMENTS 4,594,091  6/1986  Girvan .................................. 514/64

*Primary Examiner*—Timothy M. McMahon
*Attorney, Agent, or Firm*—McAndrews, Held & Malloy, Ltd.

[57] ABSTRACT

The present invention is directed to a method for adjusting the pH of the water in a hot tub or a spa without clouding to within the range of 7.0 to 8.0, without adversely removing calcium, and without adversely increasing the total alkalinity of the water. The method of the present invention comprises the steps of:

a) adding to the water in the hot tub or spa from one to five pounds of buffer per 500 gallons of water, the buffer comprising from about 90% to 99.5% by weight boric acid and from about 10% to about 0.5% by weight sodium carbonate; and b) allowing the buffer to dissolve in the water;

whereby the water is buffered without clouding to a pH within the range of 7.0 to 8.0, the dissolved calcium is not substantially removed, and the total alkalinity of the water is not adversely increased.

In a preferred embodiment of the method, the pH of the spa or hot tub water is adjusted and/or maintained within the range of 7.2 to 7.8.

9 Claims, No Drawings

BUFFER AND METHOD FOR BUFFERING HOT TUBS AND SPAS

BACKGROUND OF THE INVENTION a. Field of the Invention

The present invention is directed to buffers for use in hot tubs and spas. More particularly, the present invention is directed to a buffer for a hot tub or spa that is non-clouding and that is capable of adjusting the pH without negatively affecting either total alkalinity or the calcium content of the water. The present invention is useful because it eliminates the need for dangerous acids and/or alkalies to adjust the pH of a hot tub or spa.

b. Background

One of the desirable features of both spas and hot tubs (collectively "spas") is the heated circulating water that provides a relaxing or massage-like atmosphere. Ideally, the water in the spa must be compatible with both man and machine. Three components of the water are of particular interest. They are pH, total alkalinity and calcium content.

In a spa, it is desirable that the pH be adjusted to within the range 7.2–7.8, with a pH of 7.5 being considered ideal. A pH in a range below 7.2 leads to chemical corrosion of metallic equipment such as heaters and pumps, while a pH in a range above 7.8 can cause cloudy water and scale due to precipitation of calcium from the water. In addition, elevated pH also dramatically reduced the ability of chlorine and possibly bromine to effectively sanitize the water.

In addition, it is desirable that the spa water have a total alkalinity within the range of about 80–120 ppm. "Total alkalinity" is a measure of the alkalinity contributed by hydroxide, carbonate and bicarbonate in a natural or a treated water supply based upon titration to pH 4–5, such as with a methyl orange indicator. "Standard Methods for the Examination of Water and Waste Water," 12th Edition APHA, 1965 at p. 48–52. Total alkalinity below about 80 ppm can also cause corrosion but also increases the difficulty to maintain a proper pH. When the total alkalinity exceeds about 120 ppm an increase in cloudiness and scale formation can be realized and the pH has a tendency to constantly drift upwards.

Finally, it is desirable that the water in the spa have a calcium content of 150–300 ppm as calcium carbonate. Of the three components of interest, the calcium concentration is the most difficult to control. Calcium is easily increased, but difficult to reduce. A typical process for calcium reduction is water softening wherein sodium ions (Na+) are substituted for calcium ions (Ca++). However, calcium levels below about 100 ppm are not desirable. Low calcium (soft) water is considered aggressive and will result in the corrosion of finishes and metal fittings, such as on heaters.

Typically, the pH and total alkalinity of spa water is adjusted into the desired ranges by the addition of strong acids and/or bases (alkalies). However, strong acids and alkalies are dangerous to handle, requiring that special precautions and protective clothing be used. It is an object of the present invention to develop a composition and method that provides the desired pH and total alkalinity for spa water that does not utilize a strong acid and/or base.

One attempt at controlling the pH of spa water was provided by Robard of Atlanta, Ga. Robard's product, Perfect pH, is based upon the use of phosphate in a buffering system. While effective in adjusting pH, the Robard product dramatically increased the total alkalinity measurement and removes calcium by precipitating calcium phosphate. The result is a normal pH, a high total alkalinity measurement and negligible calcium concentration. Further, the addition of the phosphate buffer can cloud the spa water for days resulting in clogged filters or worries over clogged filters and an inability to readjust total alkalinity and calcium hardness.

Accordingly, it is an object of the present invention to provide a composition that is not only capable of controlling pH, but that does not cloud the water. It is also an object of the present invention that the composition not adversely affect the total alkalinity nor the calcium concentration of the spa water.

SUMMARY OF THE INVENTION

The present invention is directed to a non-clouding method for adjusting the pH of the water in a hot tub or spa. The method of the present invention provides the additional benefits of not adversely decreasing the calcium concentration, such as occurs with phosphate buffers, nor adversely increasing the total alkalinity, such as occurs with carbonate and phosphate buffers. Further, the method of the present invention does not require the use of dangerous hydroxides nor the special equipment needed to safely handle them. Thus, the present invention is directed to a method for adjusting the pH of the water in a hot tub or a spa without clouding, without adversely removing calcium, and without adversely increasing the total alkalinity of the water.

The method of the present invention comprises the steps of:

a) adding to the water in the hot tub or spa From one to five pounds of buffer per 500 gallons of water, the buffer comprising from about 90% to 99.5% by weight boric acid and from about 10% to 0.5% by weight sodium carbonate; and b) allowing the buffer to dissolve in the water, whereby the water is buffered to a pH within the range of 7.0 to 8.0 without clouding, the dissolved calcium is not substantially removed, and the total alkalinity of the water is not adversely increased.

Preferably, the method of the present invention adjusts the pH of the water to within the range of 7.2 to 7.8, more preferably to about 7.5, i.e., 7.4 to 7.6.

DETAILED DESCRIPTION OF THE INVENTION

The present invention is directed to a method for adjusting the pH of the water in a hot tub, spa or pool (collectively "hot tub or spa"), such that the adjusted water is compatible both with the equipment circulating, heating, and filtering the water, and with the persons using the water.

The method of the present invention comprises the steps of:

a) adding to the water in a hot tub or spa from 1 to 5 pounds of buffer per 500 gallons of water, the buffer comprising from about 90% to 99.5% by weight boric acid and from about 10% to about 0.5% by weight sodium carbonate; and b) allowing the buffer to dissolve in the water.

The resulting buffered water in the hot tub or spa is both people and equipment compatible for several reasons. Unlike phosphate buffers, which tend to precipitate dissolved calcium as calcium phosphate, thereby clogging expensive filters and back pressuring the pumps, the method of the present invention employs a clear dissolving buffer that does not precipitate dissolved calcium. Accordingly, with the method of the present invention, the user need not worry about precipitates that clog filters and back pressure the circulating pumps.

Secondly, the method of the present invention produces a buffered water for a hot tub or spa that is compatible with metallic surfaces because the dissolved calcium concentration is not adversely decreased, such as occurs with a phosphate buffer. The higher calcium concentrations associated with the buffering method of the present invention minimize the corrosive effect of low calcium water (soft water) on the metallic surfaces of equipment. Thus, the method of the present invention offers significant advantages over the phosphate buffers of the prior art method.

The method of the present invention adjusts and/or maintains the pH of the water in a hot tub or spa between 7.0 and 8.0. To adjust and/or maintain the pH, the method adds from 1 to 5 pounds of buffer per 500 gallons of water. Preferably, the method of the present invention adds from 1.5 to 3 pounds of buffer per 500 gallons of water.

The buffer that is used in the method of the present invention comprises from about 90% to 99.5% by weight boric acid and 10% to 0.5% by weight sodium carbonate. At the extremes, the combination of 90% boric acid and 10% sodium carbonate adjusts the water in the hot tub or spa to about pH 8.0. The combination at the other extreme of 99.5% boric acid and 0.5% sodium carbonate adjusts the pH of the water in the hot tub or spa to about 7.0.

Preferably, the pH of the water is adjusted to fall within the range of 7.2 to 7.8, more preferably pH 7.4–7.6, i.e., about pH 7.5. The more preferred pH is obtained by adding from 1 to 5 pounds of buffer comprising about 95.8% by weight boric acid and 4.2% by weight sodium carbonate.

Although the method of the present invention directly employs carbonates it does not directly contribute substances to the water that are components of total alkalinity.

Ideally, the method of the present invention is capable of adjusting the pH of an unsoftened municipal water in a hot tub or spa to within the range of 7.0 to 8.0 to produce a water having a dissolved calcium within the range of 150 to 300 ppm (when measured as calcium carbonate) and a total alkalinity within the range of 80 to 120 ppm. However, some municipal water supplies can have a natural calcium level well below 150 ppm or well above 300 ppm. The buffering method of the present invention will not effect this either way. The advantage of the present method over the previous system is that the low calcium water can be elevated while a high calcium water will not become cloudy or scale forming.

The boric acid that is suitable for use in the present invention is commercially available from U.S. Borax, Los Angeles, Calif. as their 99% technical grade material. A suitable sodium carbonate is the 99% technical grade material that is commercially available from Allied Chemicals, Morristown, N.J.

The method of the present invention is capable of being safely performed by the average do-it-yourselfer or maintenance man exercising reasonable care. The method of the present invention is particularly safe when compared to existing methods that use concentrated acids and alkalis to make pH adjustment. These latter methods require both special clothing and extreme precautions that are commensurate with the risk. Accordingly, the method of the present invention also offers significant safety advantages over the concentrated acid and alkali methods of the prior art.

What is claimed is:

1. A method of adjusting the pH of the water in a hot tub or spa to between 7.0 and 8.0 without adversely removing calcium or increasing the total alkalinity of the water, the method comprising the steps of:
    a) adding to said water from 1 to 5 pounds of buffer per 500 gallons of water, said buffer comprising from about 90% to 99.5% by weight boric acid and from about 10% to about 0.5% by weight sodium carbonates; and
    b) allowing said buffer to dissolve in said water; whereby said water is buffered without clouding to a pH within the range of 7.0 to 8.0, the dissolved calcium in said buffered water is not substantially removed, and the total alkalinity of the water is not adversely increased.

2. The method of claim 1 wherein the pH of the water in the hot tub or spa is adjusted to be within the range of 7.2 to 7.8.

3. The method of claim 1 wherein the dissolved calcium in said buffered water is within the range of 150 to 300 ppm, when measured as calcium carbonate.

4. The method of claim 3 wherein the total alkalinity in said buffered water is within the range of 80 to 120 ppm.

5. The method of claim 1 wherein in Step (a) from 1.5 to 3.0 pounds of buffer is added per 500 gallons of water.

6. The method of claim 2 wherein from 1.5 to 3.0 pounds of buffer is added per 500 gallons of water.

7. The method of claim 2 wherein the pH of the hot tub or spa is adjusted to be within the range of 7.4 to 7.6.

8. The method of claim 7 wherein from 1.5 to 3.0 pounds of buffer is added per 500 gallons of water.

9. The method of claim 8 wherein the composition of the buffer comprises about 95.8% by weight boric acid and 4.2% by weight sodium carbonate.

* * * * *